US007392130B1

(12) United States Patent
Rosen et al.

(10) Patent No.: US 7,392,130 B1
(45) **Date of Patent: *Jun. 24, 2008**

(54) SYSTEM AND METHOD FOR DETERMINING TRAFFIC CONDITIONS

(75) Inventors: Kenneth H. Rosen, Middletown, NJ (US); Pradeep K. Bansal, Monmouth Junction, NJ (US); Diane Banks, Greenwood Lake, NY (US); Charles Douglas Blewett, Madison, NJ (US); Timothy A. Rock, Howell, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/803,872

(22) Filed: May 16, 2007

Related U.S. Application Data

(62) Division of application No. 10/749,109, filed on Dec. 29, 2003, now Pat. No. 7,228,224.

(51) Int. Cl.
*G06F 19/00* (2006.01)

(52) U.S. Cl. ........................ 701/117; 701/207; 701/118; 701/119; 701/214; 340/905

(58) Field of Classification Search ......... 701/207–208, 701/213–214, 117–119; 340/901–905, 989, 340/991–993; 342/357.01, 357.02, 357.06, 342/357.07
See application file for complete search history.

(56) References Cited

U.S. PATENT DOCUMENTS

| | | | | |
|---|---|---|---|---|
| 3,866,185 | A | 2/1975 | Etra et al. | |
| 5,289,183 | A | 2/1994 | Hassett et al. | |
| 5,539,645 | A | 7/1996 | Mandhyan et al. | |
| 6,150,961 | A | 11/2000 | Alewine et al. | |
| 6,178,374 | B1 | 1/2001 | Möhlenkamp et al. | |
| 6,236,933 | B1 | 5/2001 | Lang | |
| 6,577,946 | B2 | 6/2003 | Myr | |
| 6,587,777 | B1 | 7/2003 | St. Pierre | |
| 2003/0134648 | A1 * | 7/2003 | Reed et al. | 455/456 |
| 2003/0154017 | A1 | 8/2003 | Ellis | |

* cited by examiner

*Primary Examiner*—Gertrude A. Jeanglaude
(74) *Attorney, Agent, or Firm*—Hoffmann & Baron, LLP

(57) ABSTRACT

The present invention provides a method and apparatus for determining traffic conditions using wireless devices. A number of signals from the vehicles traveling in selected routes are received by several wireless communication networks via the wireless devices. The total number of signals received are used to compare if there are sufficient number of vehicles traveling on the selected routes. If so, then the location information of the moving vehicles at various times is determined by the wireless communication network and forwarded to a central computer. The central computer coordinates with the wireless communications network for information needed to compute traffic data. The central computer computes the velocity of the moving vehicles and a traffic profile is created based on the velocity and location information of the moving vehicles. Furthermore, the traffic profile is sent to the moving vehicles.

10 Claims, 3 Drawing Sheets

SYSTEM AND METHOD FOR DETERMINING TRAFFIC CONDITIONS

CROSS-REFERENCE TO RELATED APPLICATIONS

This application is a divisional of U.S. patent application Ser. No. 10/749,109 filed on Dec. 29, 2003, now U.S. Pat. No. 7,228,224 which is incorporated herein by reference.

FIELD OF THE INVENTION

The invention relates to the field of traffic conditions, and more particularly to method and apparatus for determining traffic conditions by tracking the locations of wireless devices in moving vehicles.

BACKGROUND OF THE INVENTION

Current systems for monitoring traffic conditions are based on observing vehicles directly with the use of video cameras installed on the poles. Traffic is observed by individuals and broadcast to the drivers via televisions or radios. Various problems are encountered with this system. One such problem is that information is not instantly updated and immediately delivered to the driver. Also, it does not provide estimate travel time between two points on a route. Moreover, it does not provide average vehicle speeds on other roadways or comparative roadway traffic information to the drivers to choose alternate routes, etc.

Some of the recently developed systems such as U.S. Pat. No. 6,236,933 include monitoring traffic on selected routes using the Global Position devices. These devices obtain the physical location information of the vehicles and the velocity of the vehicle is determined right at the moving vehicle. These systems are device-centric. In other words, all the intelligence is at the device to obtain the traffic information of the routes. However, such systems provide velocity of all vehicles on the selected routes regardless of whether these vehicles are located on a completely empty road or in heavy traffic or in a zone where traffic has been disrupted due to construction on the road or due to a recent accident on the road. Therefore, excess data is received from the devices even when there is no need to obtain the same.

Therefore, a need exists to provide wireless, accurate, instantaneous, sufficiently dense traffic information without relying on devices equipped with GPS or any other systems that are device centric.

SUMMARY OF THE INVENTION

A first embodiment of the invention provides a method for determining traffic conditions of selected routes using a wireless device. The method comprises receiving a number of signals at various times from vehicles traveling on the selected routes, counting the total number of signals received on the selected routes, comparing the total number of signals with a predetermined value, determining the location of the vehicles at various times on the selected routes if the total number of signals is greater than the predetermined value, computing velocity of the vehicles at various times on the selected routes based on the location information, creating a traffic profile based on the location and computed velocity of the vehicles, and sending the traffic profile of the selected routes to the vehicles.

A second embodiment of the present invention provides a system for determining traffic conditions of selected routes.

The system comprises a plurality of wireless devices being located in at least one vehicle traveling on the selected routes, at least one wireless communications network coupled to the wireless devices for receiving a number of signals at various times from the wireless devices located in the vehicles traveling on the selected routes, a processor coupled to the network for counting total number of signals and comparing the total number with a predetermined value, wherein the network determines a current location of the vehicles at various times on the selected routes if the total number of signals is greater than the predetermined value, and a central computer connected to the wireless communications network for computing velocity of the vehicles based on the current location received from the wireless communications network, and creating a traffic profile of the selected routes.

DETAILED DESCRIPTION OF THE INVENTION

Figure 1:
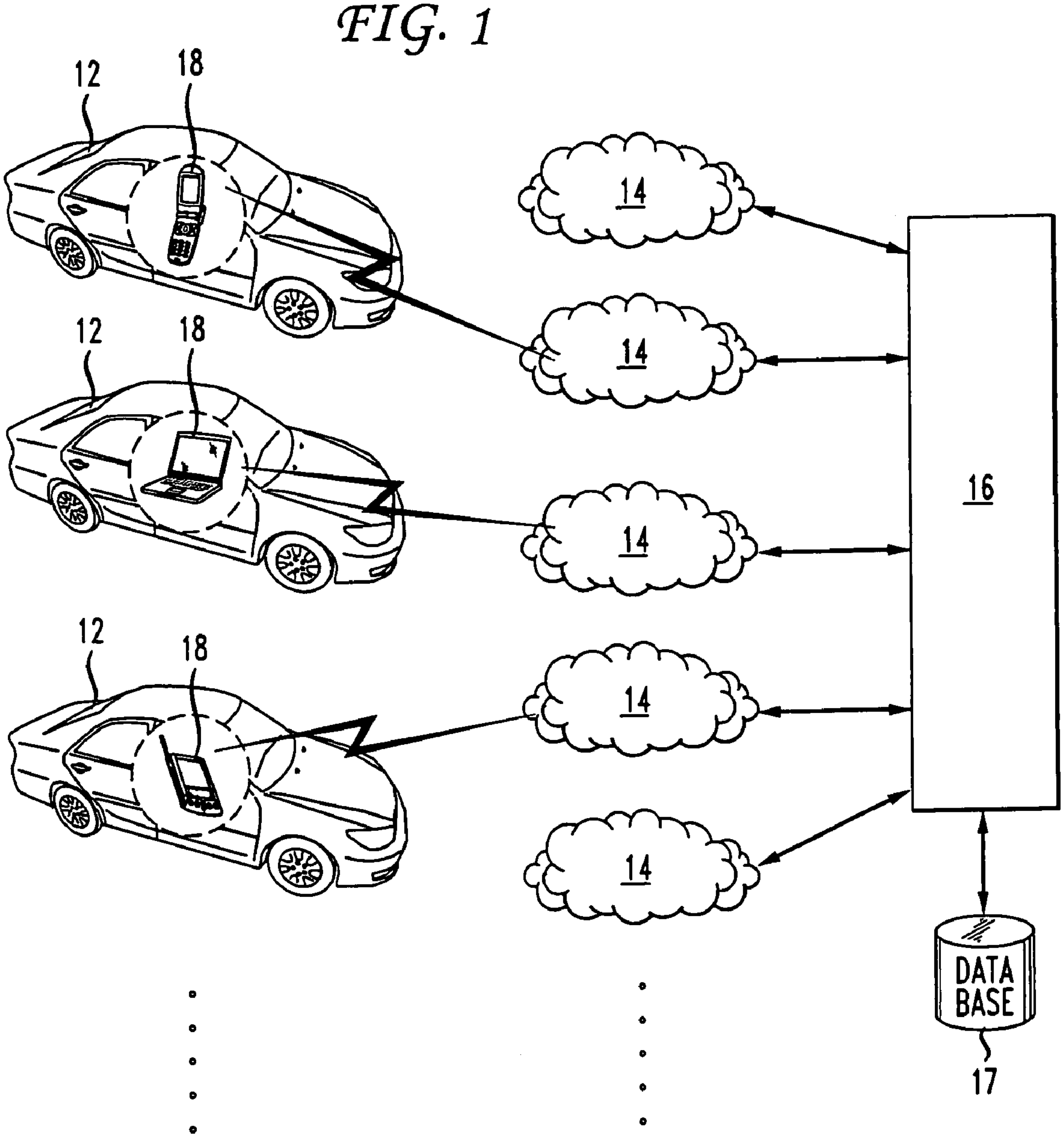
FIG. 1 is a block diagram showing the traffic determining system of the present invention.

With reference to FIG. 1, there is shown an illustrative block diagram of a traffic determining system 10 according to an embodiment of the present invention. The system 10 includes a plurality of moving vehicles 12, each of them being capable of communicating with a central computer 16 via several wireless communication networks 14. Each of the moving vehicles 12 includes a wireless device 18 capable of transmitting its signals to the wireless communication network 14. The wireless device 18 may preferably be a wireless phone, a wireless lap-top computer, a wireless PDA, or a wireless on-board computer coupled to the wireless communication network 14. Each of the networks 14 includes base stations (not shown) which receive the signals from the wireless devices 18 whether or not they are making a call. The base stations in the network 14 communicate back and forth with the wireless devices 18. Each of networks 14 using each of their base stations are monitoring and instantaneously determining the physical location of the wireless devices 18. The physical location information and other useful information of the moving vehicle 12 is transmitted to the central computer 16 by each of the wireless communication networks 14. Other useful information may possibly include velocity which may preferably be determined by the network 14 using properties of the signals received.

In order to determine traffic conditions, it is necessary to track the location of wireless devices 18 presumed to be in vehicles 12 moving on selected routes. The wireless provider can poll all its current users, or a group of users self-enrolled in this service, and use this information to determine the average velocity of these users on roadways. The moving vehicles 12 are polled periodically to track their locations in a particular route. For the moving vehicles 12 that are not traveling on the roadways/routes of interest, there is no need to obtain any relevant data and are not included in the polling. However, for the moving vehicles 12 traveling on the roadways of interest, the relevant data of the moving vehicle 12 is obtained. The relevant data can preferably include, along with the time of the day, in particular, the velocity of vehicle 12, exact location of the vehicle 12 at various times, etc. The average velocity of the moving vehicles 12 at a particular route may preferably be determined. Furthermore, the vehicles 12 with a zero velocity will not be included in the poll, mainly because they do not affect traffic conditions in a particular route. A vehicle with zero velocity can preferably be flagged to see if there is a problem with either the vehicle 12 or the passenger in the vehicle 12.

Alternatively, the velocity of the moving vehicles 12 can be determined using technological means well known in the art. Such means include measuring of the signal strength, power consumption of the vehicle changes in signal angle measured via the antenna, etc.

As mentioned earlier, each wireless device 18 is also coupled to its corresponding the wireless communication network 14, which receives the signals at various times from the vehicles 12 traveling on the selected routes via the wireless devices 18. Each of the networks 14 include a processor 15 (not shown) which counts the total number of signals received by the network 14 and compares the total with a predetermined value. This predetermined value is already established which includes a specific number of signals required in order to determine the location information of the moving vehicles 12. In other words, it is necessary to have sufficient number of vehicles traveling on the selected routes in order to determine the locations of these vehicles. If the number of vehicles traveling on the selected routes are insufficient, then the location of those moving vehicles 12 is not determined merely because there is not much traffic on those routes. However, if there are enough vehicles traveling on those selected routes, i.e., if during comparison, the total number of signals received from the wireless devices 18 is more than the pre-determined value, then each of the wireless communication networks 14 will determine the current location of those vehicles 12 at various times.

The location information for moving vehicles 12 can be provided using a variety of different methods. These methods include E911 systems, LORAN (long-distance radio navigation) or mobile communication devices integrated with GPS devices, all methods well known to one skilled in the art. In one embodiment of the invention, the physical location and/or other useful information of the moving vehicles 12 computed by these devices can preferably be integrated by the wireless communication network 14. The network 14 can then compute velocity of the moving vehicle 12 and transmit the same to the central computer 16.

In one embodiment of the invention, the velocity of the moving vehicle 12 can be preferably determined by calculating the relative velocity of each of the moving vehicles 12 based on the distance traveled by the wireless device 18 in a specific time period. The times and positions of the vehicle 12 are determined and then the amount of time it takes the signal to travel from one position to another is determined or calculated, thereby providing the exact location of the vehicle 12. The exact location at various times is transmitted to the central computer 16 by each of the wireless communications networks 14 as will be discussed in detail below. The central computer 16 is then able to calculate the relative velocity of the moving vehicle 12 based on the distance traveled by the wireless device 18. The location info can preferably be as precise as a specific lane on the roadway, thereby determining the average velocity and traffic info on a specific lane.

The current location information determined by the network 14 including the time will be transmitted to the central computer 16. The central computer 16 receives and collects the current location of the vehicles 12 from multiple routes at the same time and stores all the same in the database 17. The central computer 16 coordinates back and forth with the wireless communications networks 14 for all the information needed to compute the traffic profile data. The stored data in the database 17 is constantly updated as the location information of the moving vehicle 12 is submitted by each of the wireless communication networks 14 in the region. Also, stored in the database 17 is a record of each user of the wireless device 18. The record includes identity information of the user and the phone number of their wireless device 18. The record also includes each user's selection of automatically receiving traffic profile information or receiving traffic profile information only upon request. The record may preferably also include user's selection of which format he/she would prefer to receive traffic information. Some of the formats include text, video, audio, etc. The central computer 16 uses the location information stored in the database 17 and computes velocity of each of the moving vehicles 12 at various times in the selected routes and stores the same in the database 17. Based on all the information stored in the database 17, the central computer 16 creates a traffic profile of the selected routes whose location information was determined by the wireless communication networks 14.

In an alternate embodiment of the present invention, the computer 16 may preferably coordinate with the GPS devices for any further information it may require. In this situation, GPS device functions as a secondary source, sending any additional information to the central computer 16 not provided by the wireless communications network 14. The central computer 16 incorporates the additional information received from the GPS device to create the complete traffic profile data.

This traffic profile information is computed by any software program well known in the art. The traffic profile information will preferably include the average velocity of the vehicles on selected routes vehicle 12 is traveling on. Also, the traffic profile information may include the estimated time of arrival to the destination of the moving vehicle 12 based on the traffic conditions. Furthermore, the traffic profile information may also provide to the moving vehicle 12 directions to alternate routes then the one the vehicle 12 is traveling on. The traffic profile may also include data on the road conditions, such accident occurrence, the construction sites on the roads, stop and go traffic, etc. The traffic profile created by the central computer 16 is downloaded and sent to the moving vehicle 12 via the corresponding wireless communication network 14. As discussed earlier, the traffic profile can be presented to the vehicle 12 in several formats such as text, video, audio or the combination. Furthermore, the central computer 16 has the capability to keep all the information secured and confidential, thereby respecting the privacy of the users of the wireless devices 18. Therefore, immediately upon sending the traffic profile to the wireless device 18, the central computer 16 removes all the user's records including identity information, telephone number, current location information etc.

Figure 2A:
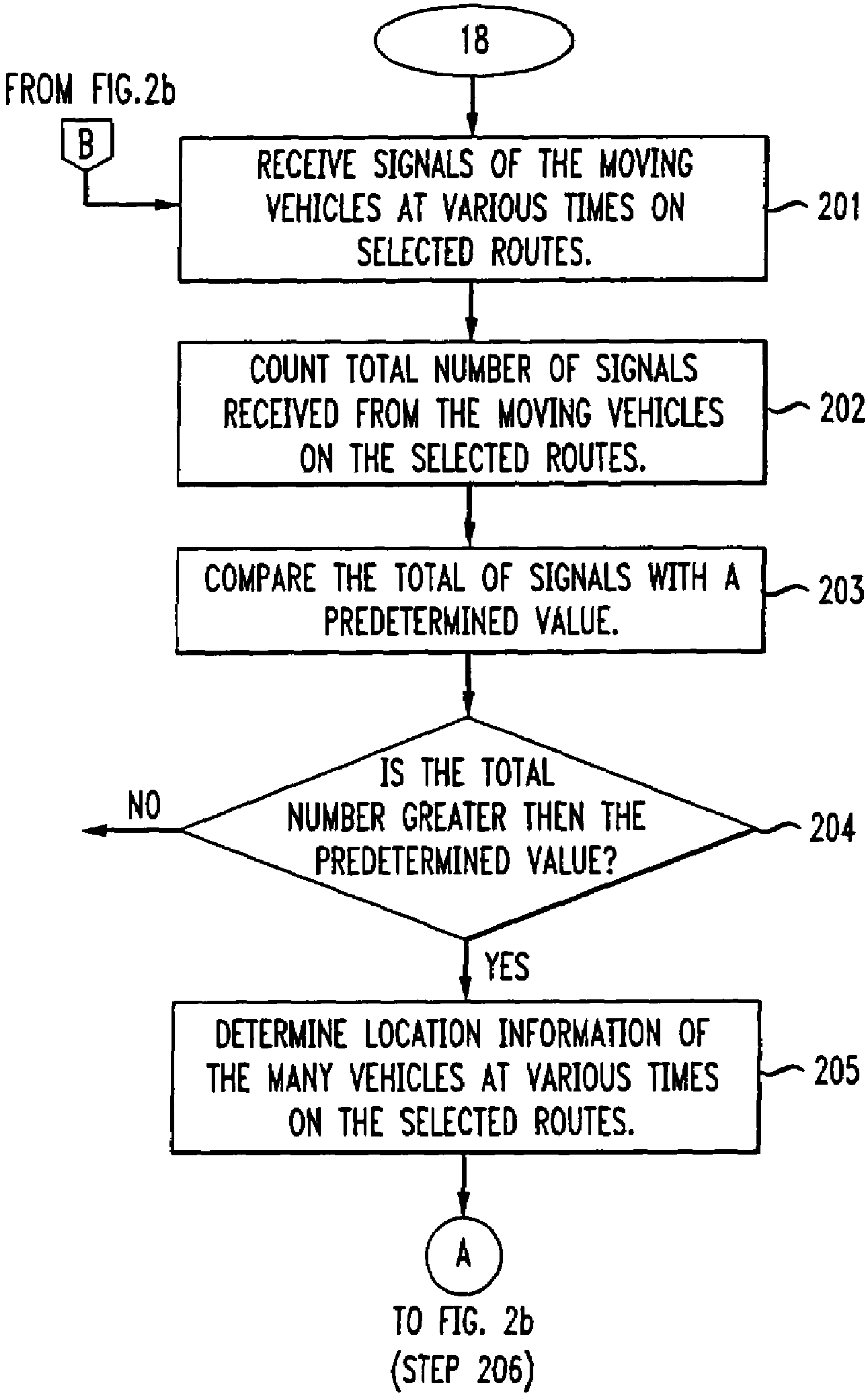
FIGS. 2*a* and 2*b* show a flow chart showing the steps for determining the traffic conditions according to the present invention.
Figure 2B:
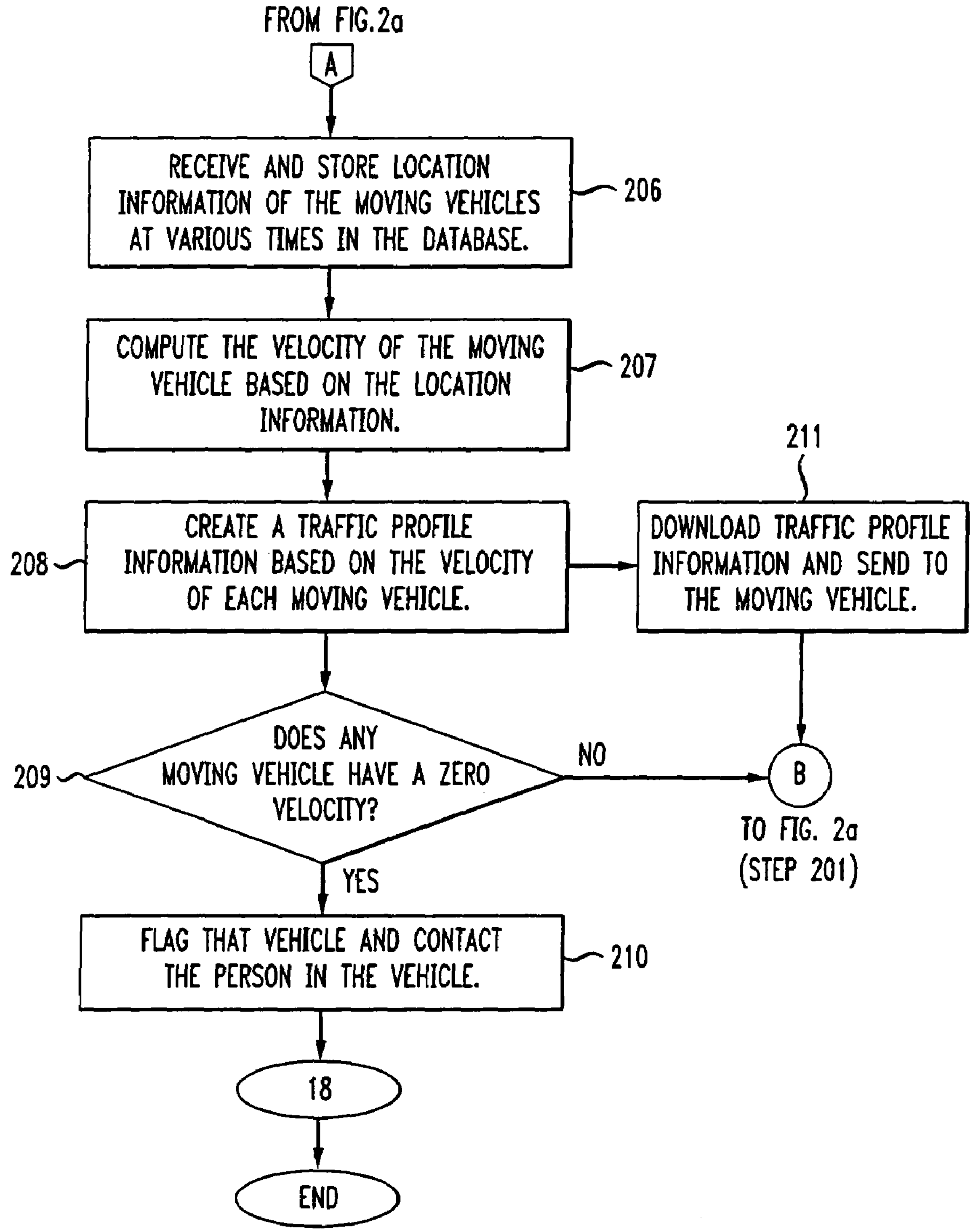

FIGS. 2*a* and 2*b* show a flowchart illustrating one embodiment for determining the traffic conditions of the moving vehicles. The signals of the vehicles 12 traveling on selected routes at various times is received at step 201 by each of the wireless networks 14 via the wireless device 18. Upon receipt of the signals, at step 202, total count of number of signals received for each moving vehicle 12 is determined. At step 203, the total count of the number of signals is compared with a pre-determined value. The pre-determined value is an already established value which defines a specific number of signals required to determine the location of the moving vehicles 12 in a selected route. This pre-determined value establishes the fact that certain number of vehicles 12 are needed to be traveling on a selected route to determine their location information. Based on the comparison, at step 204, it is determined whether the total count of signals is greater than the predetermined value. If the total count is less than the predetermined value, then the location information of the moving vehicles 12 is not determined. However, if it is greater than the predetermined value, then the location information of the vehicles 12 traveling on the selected routes is determined at step 205 by the corresponding wireless communication network 14. The wireless communication networks 14 determine the current location of the moving vehicles 12 at various times and forwards the same to the central computer 16. Upon receipt of this information, the central computer 16 at step 202 stores this information in the database 17 in accordance with the selected routes in the region. The database 17 is constantly updated with current traffic information of the moving vehicle 12. Then at step 207, the velocity of the moving vehicle is determined using a software program known to one skilled in the art. At step 208, a traffic profile for each moving vehicle is created based on the computed velocity information. The traffic profile information includes the average velocity of the moving vehicle at various routes, estimated time of arrival to a destination, directions to alternate routes of the moving vehicles, road conditions, etc., as mentioned above. At step 209, the traffic profile information is used to determine if any vehicle has a zero velocity, i.e., it is not moving. If a vehicle has a zero velocity, that vehicle is preferably flagged in the traffic profile information at step 210 to contact the person in the vehicle if there is a problem with the vehicle or a person in the vehicle. Referring back to step 208, when the traffic profile information is determined, then at step 211, the traffic profile information is downloaded and sent to the moving vehicles 12. The traffic profile information may preferably be sent upon the request of the user in the moving vehicle 12 or may automatically be forwarded to the moving vehicle if the user of the moving vehicle has already selected to receive the same as discussed above.

It is to be noted that the present invention is not restricted to include cars, buses, bicycles, motorcycles, etc. traveling on the roads but may also preferably include trolleys, trains, monorails traveling on the tracks and airplanes, helicopters traveling in the air and/or the runaway. Traffic conditions of the tracks can be determined using the wireless devices located on the trains by the means described in the present invention. Similarly traffic conditions in the air with wireless devices located on the airplanes can preferably be determined using the system of the present invention.

While the invention has been described in relation to the preferred embodiments with several examples, it will be understood by those skilled in the art that various changes may be made without deviating from the spirit and scope of the invention as defined in the appended claims.

What is claimed is:

1. A method for directing traffic between selected routes using a wireless device, said method comprising:

providing a plurality of wireless signal devices in vehicles traveling over a selected route;

generating a location signals from said wireless signal devices;

establishing a network of wireless signal receivers for receiving said location signals;

receiving said location signals from said plurality of wireless signal devices at said network of wireless signal receivers;

correlating the location signals for each of said wireless signal devices to said selected route;

resolving the velocity of each of said vehicles on a real time continuous basis from said location signals;

establishing a traffic profile associated with the selected route based on the location signals and resolved velocity of said vehicles; and optimizing utilization of said selected route by directing said vehicles based on said traffic profile.

2. The method for directing traffic between selected routes using a wireless device according to claim 1, wherein optimizing the utilization of said predetermined routes includes directing said vehicles to an underutilized route.

3. The method for directing traffic between selected routes using a wireless device according to claim 1, wherein a traffic profile includes at least one of an average velocity of said vehicles traveling in said selected routes, an estimated time of arrival for said selected routes, driving directions of said selected routes, and driving directions of alternate routes.

4. The method for directing traffic between selected routes using a wireless device according to claim 1, wherein said wireless device includes at least one of a wireless phone, wireless computer, and wireless PDA.

5. A method of directing traffic using wireless devices comprising:

determining locations and velocities of vehicles using location signals, the location signals being output from wireless devices associated with the vehicles;

determining routes on which the vehicles are located from the location signals;

calculating traffic profiles associated with the routes based on the locations and velocities of the vehicles; and providing directions to the wireless devices based on the traffic profiles.

6. The method of directing traffic using a wireless device according to claim 5, wherein providing directions to the vehicles based on the traffic profiles comprises directing the vehicles to an underutilized route.

7. The method of directing traffic using a wireless device according to claim 5, wherein the traffic profiles comprise at least one of an average velocity, an estimated time-of-arrival to a destination, driving directions along the routes, and driving directions to an alternate route.

8. The method of directing traffic using a wireless device according to claim 5, wherein said wireless devices comprise at least one of a wireless phone, wireless computer, and wireless PDA.

9. The method of directing traffic using a wireless device according to claim 5, wherein the velocities of the vehicles are determined on a real-time basis.

10. The method of directing traffic using a wireless device according to claim 5, wherein the velocities of the vehicles are determined continuously.

* * * * *